US008611456B2

(12) United States Patent
Hashimoto et al.

(10) Patent No.: US 8,611,456 B2
(45) Date of Patent: Dec. 17, 2013

(54) ISOLATED COMMUNICATION SYSTEM

(75) Inventors: Takao Hashimoto, Osaka (JP);
Hiroyuki Miyachi, Kyoto (JP)

(73) Assignee: Panasonic Corporation, Osaka (JP)

( * ) Notice: Subject to any disclaimer, the term of this patent is extended or adjusted under 35 U.S.C. 154(b) by 351 days.

(21) Appl. No.: 13/071,186

(22) Filed: Mar. 24, 2011

(65) Prior Publication Data

US 2011/0235737 A1 Sep. 29, 2011

(30) Foreign Application Priority Data

Mar. 29, 2010 (JP) .................................. 2010-074802

(51) Int. Cl.
*H04B 15/00* (2006.01)

(52) U.S. Cl.
USPC ........................................................ 375/285

(58) Field of Classification Search
USPC .................. 375/257–258, 285, 377; 333/119
See application file for complete search history.

(56) References Cited

U.S. PATENT DOCUMENTS

| 3,967,058 | A | * | 6/1976 | Moriya et al. ................ 370/294 |
| 5,952,849 | A | | 9/1999 | Haigh |
| 6,262,600 | B1 | | 7/2001 | Haigh et al. |
| 6,525,566 | B2 | | 2/2003 | Haigh et al. |
| 6,903,578 | B2 | | 6/2005 | Haigh et al. |
| 6,922,080 | B2 | | 7/2005 | Haigh et al. |
| 7,075,329 | B2 | | 7/2006 | Chen et al. |
| 7,376,189 | B2 | | 5/2008 | Tanaka |
| 7,514,844 | B2 | * | 4/2009 | Unkrich ........................ 310/317 |
| 7,923,710 | B2 | * | 4/2011 | Crawley et al. ............... 250/551 |
| 2009/0212759 | A1 | * | 8/2009 | Melanson ................. 324/76.11 |
| 2011/0026612 | A1 | * | 2/2011 | Lombardo et al. ............ 375/257 |

FOREIGN PATENT DOCUMENTS

| JP | 02-084846 | 3/1990 |
| JP | 2001-513276 | 8/2001 |
| JP | 2003-523147 | 7/2003 |

* cited by examiner

*Primary Examiner* — Khanh C Tran
(74) *Attorney, Agent, or Firm* — McDermott Will & Emery LLP

(57) ABSTRACT

A transmission unit includes a transmission pulse signal generating circuit which generates a transmission pulse signal having pulses corresponding to a plurality of clock signals generated in a clock signal generating circuit, existing between a first pulse and a second pulse which are generated in an edge pulse generating circuit. A receiving unit is configured to decode a received pulse signal based on the transmission pulse signal received from the transmission unit via an isolated communication unit, as a signal that transitions from a first level to a second level when an initial pulse of the received pulse signal is detected and that transitions from the second level to the first level when a subsequent pulse is not detected within a predetermined first time period from when a most recent pulse of the received pulse signal is detected.

6 Claims, 4 Drawing Sheets

ISOLATED COMMUNICATION SYSTEM

CROSS-REFERENCE TO RELATED APPLICATION

The disclosure of Japanese Patent Application No. 2010-074802 filed on Mar. 29, 2010 including specification, drawings and claims is incorporated here in by reference in its entirety.

BACKGROUND OF THE INVENTION

1. Field of the Invention

The present invention relates to an isolated communication system which transmits a digital input signal from a transmission unit to a receiving unit isolated from the transmission unit, and a transmission unit and a receiving unit which are applicable to the isolated communication system.

2. Description of the Related Art

In regard to a device such as a switching power supply, or a motor driving device, which includes a high-voltage/high-current driving section such as a power device or the like and a relatively low-voltage/low-current control section such as a controller or the like for controlling (inverter controlling) of the driving section, there is known a configuration in which the driving section and the control section which have different breakdown voltages are electrically isolated from each other and transmission and receipt of signals between these sections is performed by means of isolated communication in order to prevent the control section from being broken down or operating abnormally due to high voltages and high currents used in the driving section. In such a device, isolated communication between the control section and the driving section is performed in such a manner that a digital input signal input to a transmission unit of the control section is, after its conversion into a pulse signal, transmitted to a receiving unit of the driving section. In this communication, if some transmission errors occur due to disturbance or the like in a transmission path used for such isolated communication, it becomes unable to transmit correct signals. For example, in a case where pulses are generated according to detection of a rising and a falling of a digital input signal, if it cannot be identified whether a pulse to be detected in the receiving unit is a rising or a falling of the digital input signal, decoding into a correct digital input signal in the receiving unit becomes impossible.

The addition of redundant signal lines or bits for the purpose of correcting errors, which is generally used in the digital communications or the like in order to prevent the transmission errors, is not preferable, because its structure will become complicated and its cost will increase. Besides, there are increases in delay time and power consumption. In particular, if there is an increase in delay time, it becomes impossible to increase a frequency of switching. Therefore, performance of device (for example, performance of power conversion) would be degraded significantly.

Also, there is known a configuration in which pulses correspondingly respectively to a rising and a falling of a transmission signal are transmitted in different forms (for example, see U.S. Pat. No. 7,075,329 and JP-T-2001-513276). In U.S. Pat. No. 7,075,329, a pulse corresponding to a rising is a positive pulse while a pulse corresponding to a falling a negative pulse. In JP-T-513276, a single pulse is generated in correspondence to a falling while two pulses are generated in correspondence to a rising. Furthermore, there is known a configuration in which a pulse corresponding to a rising and a pulse corresponding to a falling are separately transmitted using different isolated communication paths (for example, see JP-T-2003-523147).

SUMMARY OF THE INVENTION

However, in a configuration disclosed in U.S. Pat. No. 7,075,329, each circuitry in the transmission and receiving units becomes complicated. In addition, if, in a configuration disclosed in JP-T-2001-513276 the number of pulses detected in the receiving unit varies due to disturbance or the like, correct decoding cannot be carried out, which makes it difficult to accomplish high-accuracy signal transmission. In addition, in a configuration disclosed in JP-T-2003-523147, it is possible to detect a transmission error, but impossible to conduct an error correction. Furthermore, since a plurality of isolated communication paths are required, a circuitry of each unit becomes complicated and, in addition, the device increases in size.

The present invention was devised with a view to providing solutions to the problems. Accordingly, an object of the present invention is to provide an isolated communication system capable of accomplishing high-accuracy isolated communication with a simple configuration, and to provide a transmission unit and a receiving unit which are applicable to the isolated communication system.

An isolated communication system of the present invention comprises a transmission unit, a receiving unit which is isolated from the transmission unit and an isolated communication unit which provides isolation between the transmission unit and the receiving unit and provides signal transmission between the transmission unit and the receiving unit, in which a digital input signal that transitions between a first level and a second level different from the first level is transmitted from the transmission unit to the receiving unit via the isolated communication unit; the transmission unit including: an edge pulse generating circuit configured to detect a transition of the digital input signal from the first level to the second level and generate a corresponding first pulse and configured to detect a transition of the digital input signal from the second level to the first level and generate a corresponding second pulse; and a transmission pulse signal generating circuit configured to generate a pulse corresponding to a clock signal having a predetermined cycle during a period of time in which the digital input signal remains at the second level, and add the pulse corresponding to the clock signal to the first and the second pulses generated in the edge pulse generating circuit to generate a transmission pulse signal having pulses corresponding to a plurality of clock signals, the pulses existing between the first pulse and the second pulse each generated in the edge pulse generating circuit; the receiving unit being configured to decode a received pulse signal based on the transmission pulse signal received from the transmission unit via the isolated communication unit, as a signal that transitions from the first level to the second level when an initial pulse of the received pulse signal is detected and that transitions from the second level to the first level when a subsequent pulse is not detected within a predetermined first time period from when a most recent pulse of the received pulse signal is detected.

In accordance with the isolated communication system having the above configuration, the transmission unit detects a transition between the first level and the second level in the digital input signal, or detects a rising or a falling thereof and generates a pulse according to the detection. And, it generates a pulse based on the clock signal detected during a period of time in which the second level is held in the digital input signal. Thus, a transmission pulse signal having a train of plural pulses is generated during a period of time in which the digital input signal remains at the second level. By transmission of such a transmission pulse signal from the transmission unit to the receiving unit via the isolated communication unit, the receiving unit determines whether or not the second level is held in the digital input signal, depending on whether or not a subsequent pulse is detected within the first time period from when a pulse of the received pulse signal based on the transmission pulse signal is detected. That is, a pulse corresponding to the digital input signal is decoded as an output signal so that the second level may be held during a period of time from when a most recent pulse of the received pulse signal is detected until a subsequent pulse of the received pulse signal is detected within the first time period. Because of this, even in a case where any of the pulses of a transmission pulse signal transmitted is not detected in the receiving unit due to the effect of disturbance or the like, or even in a case where a pulse that should not exist in the transmission pulse signal is detected in the receiving unit, it is possible to easily make a determination as to which of the levels the digital input signal to be decoded in the receiving unit is at, thereby enabling the receiving unit to decode the digital input signal with high accuracy. Accordingly, it is possible to perform high-accuracy isolated communication with a simple configuration.

The receiving unit may decode the received pulse signal as a signal that transitions from the first level to the second level after an elapse of a predetermined second time period from when an initial pulse of the received pulse signal is detected. In accordance with this configuration, although a signal delay for the first time period occurs at the time when a transition from the second level to the first level is decoded and makes the period during which the second level is held longer than that of the digital input signal prior to isolated communication, such a delay for the first period is cancelled by providing a time delay when transition from the first level to the second level is decoded. In this manner, the digital input signal can be decoded with much higher accuracy.

The second time period may be equal to the first time period. By making the first time period equal to the second time period, it becomes possible that the duration in which the second level is held in the digital input signal varies little prior to and after isolated communication.

The receiving unit may include a signal holding circuit configured to output a pulse having a duration of the first time period when a pulse of the received pulse signal is input, and a cycle of the clock signal is set shorter than the first time period. Because of this, as long as the receiving unit keeps detecting a pulse of the received pulse signal based on a consecutive transmission pulse signal whose pulse interval is within the first time period, it is possible to obtain a signal having a duration of such a period of time. Therefore, even if a pulse missing occurs in the received pulse signal to be detected in the receiving unit, it is possible to decode the second level in the digital input signal with easiness and high accuracy.

A transmission unit of the present invention is a transmission unit applicable to an isolated communication system in which a digital input signal that transitions between a first level and a second level different from the first level is transmitted from the transmission unit to a receiving unit via an isolated communication unit which provides isolation between the transmission unit and a receiving unit and provides signal transmission between the transmission unit and the receiving unit; the transmission unit comprising an edge pulse generating circuit configured to detect a transition of the digital input signal from the first level to the second level and generate a corresponding first pulse and configured to detect a transition of the digital input signal from the second level to the first level and generate a corresponding second pulse; and a transmission pulse signal generating circuit configured to generate a pulse corresponding to a clock signal having a predetermined cycle during a period of time in which the digital input signal remains at the second level, and add the pulse corresponding to the clock signal to the first and the second pulses generated in the edge pulse generating circuit to generate a transmission pulse signal having pulses corresponding to a plurality of clock signals, the pulses existing between the first pulse and the second pulse each generated in the edge pulse generating circuit.

In accordance with the transmission unit having the above configuration, a transition between the first level and the second level (i.e., a rise or a fall) is detected in the digital input signal and a pulse is generated. And, a pulse is generated based on the clock signal detected during a period of time in which the second level is held in the digital input signal. Thus, a transmission pulse signal having a train of plural pulses is generated during a period of time in which the digital input signal remains at the second level. Such a transmission pulse signal is transmitted from the transmission unit to the receiving unit via the isolated communication unit. Because of this, even in a case where any of the pulses of a transmission pulse signal transmitted is not detected in the receiving unit due to the effect of disturbance or the like, or even in a case where a pulse that is nonexistent in a transmission pulse signal is detected in the receiving unit, it is possible to easily make determination as to which of the levels the digital input signal to be decoded in the receiving unit is at, thereby enabling the receiving unit to decode the digital input signal with high accuracy. Accordingly, it is possible to perform high-accuracy isolated communication by means of a simple configuration.

A receiving unit of the present invention is a receiving unit applicable to an isolated communication system in which a digital input signal that transitions between a first level and a second level different from the first level is transmitted from a transmission unit to the receiving unit via an isolated communication unit which provides isolation between the transmission unit and the receiving unit and provides signal transmission between the transmission unit and the receiving unit, the receiving unit being configured to receive a pulse signal based on a transmission pulse signal received from the transmission unit via the isolated communication unit and decode the received pulse signal, as a signal that transitions from the first level to the second level when an initial pulse of the received pulse signal is detected and that transitions from the second level to the first level when a subsequent pulse is not detected within a predetermined first time period from when a most recent pulse of the received pulse signal is detected.

In accordance with the receiving unit having the above configuration, whether or not the second level is held in the digital input signal is determined, depending on whether or not a subsequent pulse is detected within the first time period from when a pulse of the received pulse signal based on the transmission pulse signal is detected. That is, a pulse corresponding to the digital input signal is decoded as an output signal so that the second level may be held during a period of time from when a most recent pulse is detected until a subsequent pulse is detected within the first time period. Because of this, even in a case where any of the pulses of a transmission pulse signal transmitted is not detected in the receiving unit due to the effect of disturbance or the like or even in a case where a pulse that is nonexistent in a transmission pulse signal is detected in the receiving unit, it is possible to easily make a determination as to which of the levels the digital input signal to be decoded in the receiving unit is at, thereby enabling the receiving unit to decode the digital input signal with high accuracy. Accordingly, it is possible to perform high-accuracy isolated communication by means of a simple configuration.

The present invention is configured as described above and accomplishes advantages that high-accuracy isolated communication is provided with a simple configuration.

The above and further objects and features of the invention will more fully be apparent from the following detailed description with reference to accompanying drawings.

DETAILED DESCRIPTION OF THE PREFERRED EMBODIMENTS

Hereinafter, preferred embodiments of the present invention will be described with reference to the drawings. Throughout the drawings, the same or corresponding constituents are designated by the same reference symbols and will not be described repetitively.

Embodiment 1

Figure 1:
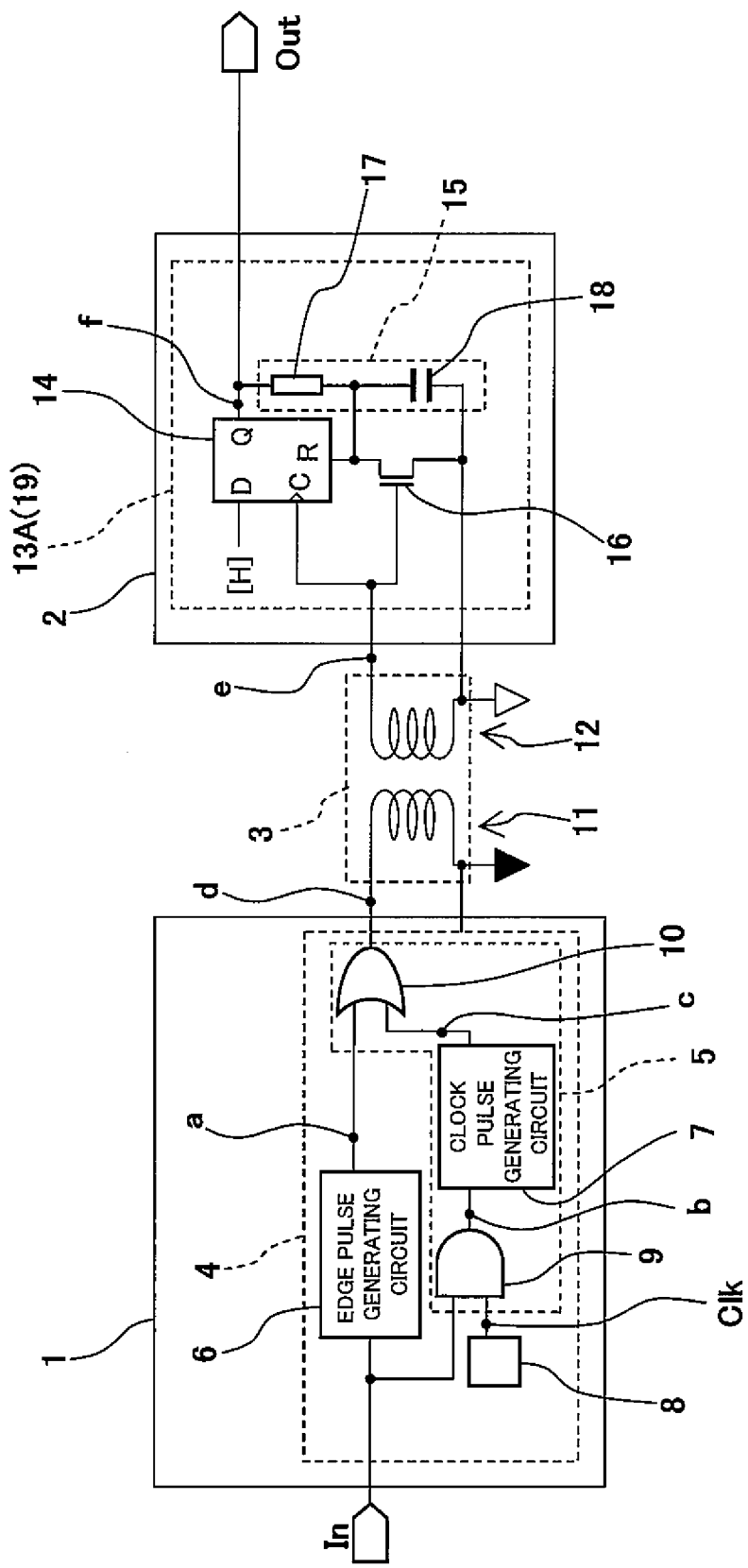
FIG. 1 is a circuit diagram showing a schematic configuration of an isolated communication system according to Embodiment 1 of the present invention.
Figure 2:
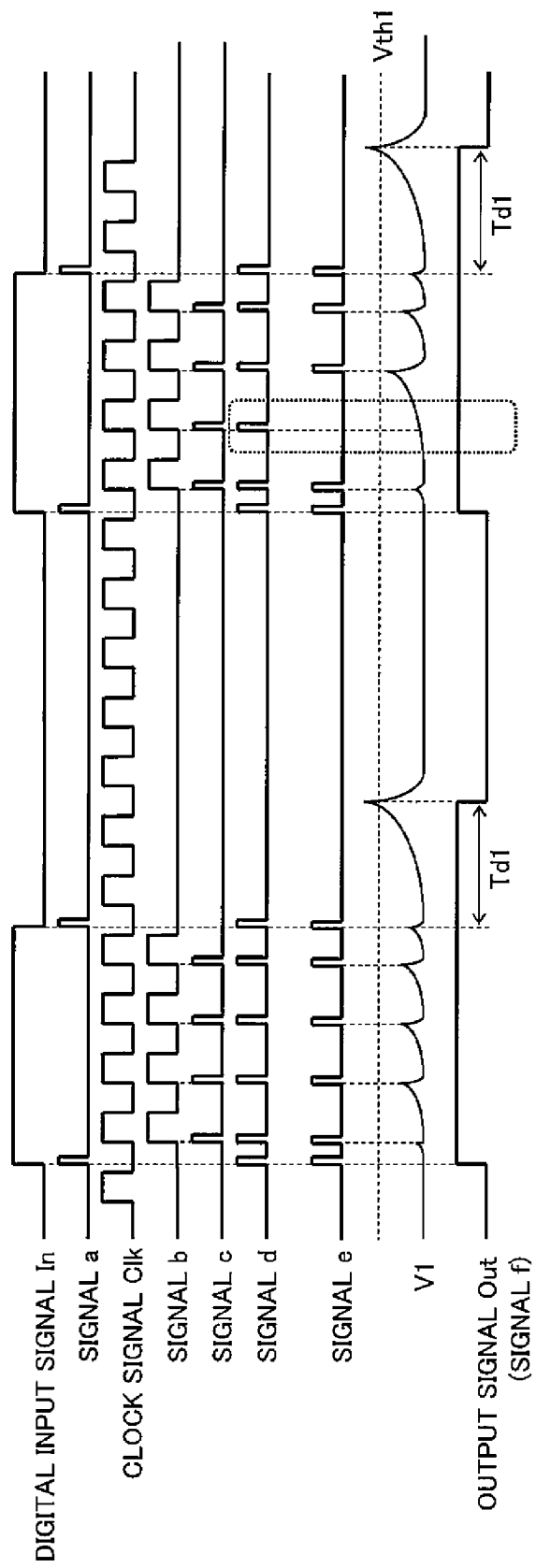
FIG. 2 is a graph showing waveforms of signals, respectively, in sections of the isolated communication system shown in FIG. 1.

Firstly, an isolated communication system according to Embodiment 1 of the present invention will be described. FIG. 1 is a circuit diagram showing a schematic configuration of the isolated communication system according to Embodiment 1 of the present invention. FIG. 2 is a graph showing waveforms of signals, respectively, in sections of the isolated communication system shown in FIG. 1.

As illustrated in FIG. 1, the isolated communication system of the present embodiment includes a transmission unit 1, a receiving unit 2 which is isolated from the transmission unit 1 and an isolated communication unit 3 which provides isolation between the transmission unit 1 and the receiving unit 2 and which performs signal transmission between the transmission unit 1 and the receiving unit 2. The isolated communication unit 3 has a transmission section 11 to which the transmission unit 1 is connected and a receiving section 12 to which the receiving unit 2 is connected, and is configured such that the transmission section 11 and the receiving section 12 are isolatedly communicable. More specifically, coils are disposed, in a mutually inductive relation, in the transmission section 11 and the receiving section 12, respectively. Each of the coils is grounded and the ground of the transmission section 11 and the ground of the receiving section 12 may be set at mutually different ground voltages.

Although in the present embodiment, there is exemplarily shown a configuration that employs mutual induction coils as the isolated communication unit 3, such a configuration is merely exemplary, and other configuration capable of transmission and reception of pulses, for example, a configuration using a photo coupler or a capacitor are also applicable.

As shown in FIG. 2, the transmission unit 1 is fed with a digital input signal "In" that transitions between a first level (for example, an L level) and a second level (for example, an H level of higher voltage than the L level). An assumed frequency of the digital input signal "In" ranges from several kHz to several hundred kHz. The transmission unit 1 transmits the digital input signal "In" to the receiving unit 2 via the isolated communication unit 3. To implement this, the transmission unit 1 has an encode circuit 4 which converts the digital input signal "In" into a pulse signal transmittable in the isolated communication unit 3.

As shown in FIG. 1, the encode circuit 4 includes an edge pulse generating circuit 6. Upon detection that the digital input signal "In" transitions from the first level to the second level (transition means a rising from L level to H level in the present embodiment and this transition is hereinafter referred to also as "first transition"), the edge pulse generating circuit 6 generates a corresponding first pulse while, upon detection that the digital input signal "In" transitions from the second level to the first level (transition means a falling from H level to L level in the present embodiment and this transition is hereinafter referred to also as "second transition"), the pulse generating circuit 6 generates a corresponding second pulse (a signal "a" shown in FIG. 2 is generated). The edge pulse generating circuit 6 may have any circuitry as long as it generates a pulse according to a state transition of the digital input signal "In".

The encode circuit 4 further includes a clock signal generating circuit 8 which generates a clock signal "Clk" that has a predetermined cycle. The clock signal generating circuit 8 is formed by an oscillating circuit or the like that outputs, for example, a signal oscillating at a predetermined cycle. Although the cycle of the clock signal "Clk" generated in the clock signal generating circuit 8 is not limited to a specific cycle, the clock signal "Clk" has a frequency higher than the assumed frequency of the digital input signal "In". Preferably, the clock signal "Clk" has a frequency that is about three to ten times as high as the frequency of the digital input signal "In". Although in the present embodiment, description has been made with regard to a configuration in which the clock signal generating circuit 8 is disposed within the encode circuit 4, such a configuration should however not be considered restrictive. Alternatively, configuration in which the clock signal "Clk" generated in an external computer or the like is input to the encode circuit 4, may be used.

The encode circuit 4 still further includes a transmission pulse signal generating circuit 5. During a period which the digital input signal "In" is at the second level, the transmission pulse signal generating circuit 5 generates pulses corresponding to the clock signals "Clk" generated in the clock signal generating circuit 8 and performs an operation of adding thus generated pulse to the first and the second pulses generated in the edge pulse generating circuit 6, thereby generating a transmission pulse signal having pulses corresponding to plural clock signals "Clk", existing between the first and the second pulses generated in the edge pulse generating circuit 6.

More specifically, the transmission pulse signal generating circuit 5 includes: a clock signal fetching circuit 9 which fetches clock signals "Clk" during a period in which the digital input signal "In" is at the second level (a signal "b" shown in FIG. 2 is generated); a clock pulse generating circuit 7 which generates clock pulses corresponding to the clock signals "Clk" fetched by the clock signal fetching circuit 9 (a signal "c" shown in FIG. 2 is generated); and an adding circuit 10 which performs an operation of adding the clock pulses generated in the clock pulse generating circuit 7 to the first and the second pulses generated in the edge pulse generating circuit 6 (a signal "d" shown in FIG. 2 is generated).

In the present embodiment, the clock signal fetching circuit 9 is constituted by an AND circuit to which the clock signal "Clk" generated in the clock signal generating circuit 8 and the digital input signal "In" are input. In addition, the clock pulse generating circuit 7 is configured such that it detects, based on the output of the AND circuit 9, a state transition of the clock signal "Clk" from L level to H level and generates a clock pulse corresponding to the clock signal "Clk". The adding circuit 10 is constituted by an OR circuit to which the outputs of the edge pulse generating circuit 6 (the first and the second pulses) and the output of the clock pulse generating circuit 7 (the clock pulse) are input.

Referring to FIG. 2, by means of the above-described configuration, the transmission unit 1 detects a transition (a rising or a falling) between the first level L and the second level H in the digital input signal "In" and, generates a pulse. And, the transmission unit 1 generates a clock pulse based on the clock signal "Clk" detected during a period in which the second level H is held in the digital input signal "In", thus generating a transmission pulse signal "d" having consecutive plural pulses. Such a transmission pulse signal "d" is transmitted from the transmission unit 1 to the receiving unit 2 via the isolated communication unit 3.

The receiving unit 2 includes a decode circuit 13A which decodes pulses of a received pulse signal "e" based on the transmission pulse signal "d" received from the transmission unit 1 via the isolated communication unit 3. The decode circuit 13A is configured to decode the received pulse signal "e" as a signal "f" that transitions from the first level L to the second level H (the first transition) when an initial pulse of the received pulse signal "e" is detected or that transitions from the second level H to the first level L (the second transition) when a subsequent pulse is not detected within a predetermined first time period Td1 from when a most recent pulse of the received pulse signal "e" is detected.

To be more detailed, the decode circuit 13A includes a signal holding circuit 19 which outputs a pulse having the duration of the first time period Td1 upon reception of a pulse of the received pulse signal "e". More specifically, the signal holding circuit 19 includes a first latch circuit 14. The first latch circuit 14 outputs an output signal of the second level H different from the first level L (higher in voltage than the first level L) when the pulse is detected. The signal holding circuit 19 further includes a first time period setting circuit 15 which starts to be charged when the output signal "f" of the first latch circuit 14 becomes the second level H and a charging voltage V1 becomes a threshold voltage Vth1 after an elapse of the first time period Td1 after the start of charging. The signal holding circuit 19 still further includes a first switching circuit 16. The first switching circuit 16 resets the first latch circuit 14 when the charging voltage V1 in the first time period setting circuit 15 exceeds the threshold voltage V1, thereby causing the output signal "f" of the first latch circuit 14 to transition to the first level L.

In the present embodiment, as the first latch circuit 14, a D flip-flop circuit with a reset terminal R is used. The D flip-flop circuit has an input terminal D to which an H level is constantly applied and a clock input terminal C which is connected to the isolated communication unit 3 and to which the pulses of the received pulse signal "e" based on the transmission pulse signal "d" transmitted from the transmission unit 1 are input. The first time period setting circuit 15 is connected to an output terminal Q. The first switching circuit 16 is connected to the reset terminal R. In the present embodiment, the output signal "f" provided from the output terminal Q becomes an output signal "Out" from the receiving unit 2.

In the present embodiment, the first switching circuit 16 is constituted by a switching element such as FET or the like. The reset terminal R of the first latch circuit 14 is connected to either one of main terminals of the FET (for example, a drain terminal of the FET). The other of the main terminals of the FET (for example, a source terminal of the FET) is grounded. In addition, the isolated communication unit 3 is connected to a control terminal of the FET (a gate terminal of the FET). The control terminal of the FET is fed with pulses from the transmission unit 1. In addition, the first time period setting circuit 15 includes a resistor 17 having one end connected to the output terminal Q of the first latch circuit 14, and a capacitor 18 which is connected in series to the resistor 17. One end of the capacitor 18 is connected to the one main terminal of the first switching circuit 16 (the reset terminal R of the first latch circuit 14) and the other end thereof is grounded. A charging voltage of the first time period setting circuit 15 is the voltage V1 of the capacitor 18 and becomes the voltage of the reset terminal of the first latch circuit 14.

In the first time period setting circuit 15, the first time period Td1 is set by time constant determined by the resistor 17 and the capacitor 18. The first time period Td1 is set longer than a cycle of the clock signal "Clk" generated in the clock signal generating circuit 8 of the transmission unit 1. Stated in another way, the cycle of the clock signal "Clk" generated in the clock signal generating circuit 8 is set shorter than the first time period Td1. More specifically, for example, the clock signal "Clk" or the time constant of the first time period setting circuit 15 is set such that the first time period Td1 has a length of time that is more than twice the cycle of the clock signal "Clk" (that is, the number of pulses corresponding to the clock signal "Clk" that are generated during the first time period Td1 is at least one or more). Here, the time constant determined by the resistor 17 and the capacitor 18 is set such that the charging voltage V1 when the capacitor 18 is charged for the first time period Td1 becomes the voltage Vth1 at which the voltage level of the reset terminal R of the first latch circuit 14 transitions from L level to H level.

In addition, an initial pulse of the received pulse signal "e" received by the receiving unit 2 is defined as the first pulse (in other words, the initial pulse of the transmission pulse signal "d" that is generated at every cycle of the digital input signal "In") corresponding to first transition (rising) from the first level L to the second level H in the digital input signal "In". A most recent pulse of the received pulse signal "e" is each pulse of the received pulse signal "e" that is detected in the decode circuit 13A.

In such a configuration, the receiving unit 2 determines whether or not the second level H is held in the digital input signal "In", according to whether or not a subsequent pulse is detected within the first time period Td1 from when the pulse of the received pulse signal "e" is detected. That is to say, a pulse corresponding to the digital input signal "In" is decoded as the output signal "Out" so that the second level H is held during a period of time in which a subsequent pulse is detected within the first time period Td1 from when a most recent pulse is detected.

In more detail, the transmission unit 1 transmits the transmission pulse signal "d" and the receiving unit 2 receives the received pulse signal "e" based on the transmission pulse signal "d". When the receiving unit 2 detects an initial pulse of the received pulse signal "e", the first switching circuit 16 is turned on. Thereby, the reset terminal R of the first latch circuit 14 is grounded to become L level. The reset is released and the second level H is applied to the clock input terminal C of the first latch circuit 14. Therefore, the output terminal Q of the first latch circuit 14 outputs the second level H (that is, the first transition is decoded). When the output terminal Q of the first latch circuit 14 becomes H level, the capacitor 18 of the first time period setting circuit 15 starts to be charged.

If the receiving unit 2 receives a new pulse by the time the first time period Td1 has elapsed after the start of charging to the capacitor 18, the first switching circuit 16 is turned ON again. Therefore, with the output terminal Q of the first latch circuit 14 being held at H level, the capacitor 18 of the first time period setting circuit 15 is caused to discharge and the time of charging is reset (the charging voltage V1 becomes the ground voltage). On the other hand, if the receiving unit 2 does not receive a new pulse by the time that the first time period Td1 has elapsed after the start of charging, the charging voltage V1 of the first time period setting circuit 15 becomes the threshold voltage Vth1. In this case, the voltage level of the reset terminal of the first latch circuit 14 becomes H level. Therefore, the first latch circuit 14 is reset and the output terminal Q of the first latch circuit 14 outputs the first level L (that is, the second transition is decoded).

With such a configuration, as long as the receiving unit 2 keeps detecting consecutive pulses with a pulse interval falling within the first time period Td1, it is possible to obtain the signal "f" (i.e., the output signal "Out") that has a duration of that period. Accordingly, even if a pulse missing occurs in the received pulse signal "e" based on the transmission pulse signal "d" detected in the receiving unit 2, it is possible to decode the second level H in the digital input signal "In" with easiness and high accuracy.

For example, as depicted in FIG. 2, even in a case where a pulse missing (a portion enclosed by broken line in FIG. 2) takes place in the received pulse signal "e", the output terminal Q of the first latch circuit 14 is held at the second level H as long as a pulse subsequent thereto is detected within the first time period Td1. Accordingly, it is possible to perform decoding without occurrence of errors. This makes it possible to prevent the system from operating incorrectly due to transmission errors. Thus, safety of the system is improved.

In addition, although the output signal "Out" decoded with respect to the digital input signal "In" is a signal in which the second level H is longer than the digital input signal "In" by the first time period Td, it is possible to provide appropriate control by setting a temporal margin for the first time period Td1, to the timing of switching based on the output signal "Out" of a switching circuit or the like in a device (for example, a driving device or the like) to which the receiving unit 2 is connected.

As described above, even in a case where any of the pulses of the transmission pulse signal "d" transmitted is not detected in the receiving unit 2 due to the effect of disturbance or the like, or even in a case where the receiving unit 2 detects a pulse that should not exist in the transmitted pulse signal, it is still possible to highly accurately decode the digital input signal "In" as the output signal "Out" in the receiving unit 2 because it is possible to easily determine which of the levels the digital input signal "In" to be decoded in the receiving unit 2 is at. This makes it possible to accomplish high-accuracy isolated communication with a simple configuration.

Embodiment 2

Figure 3:
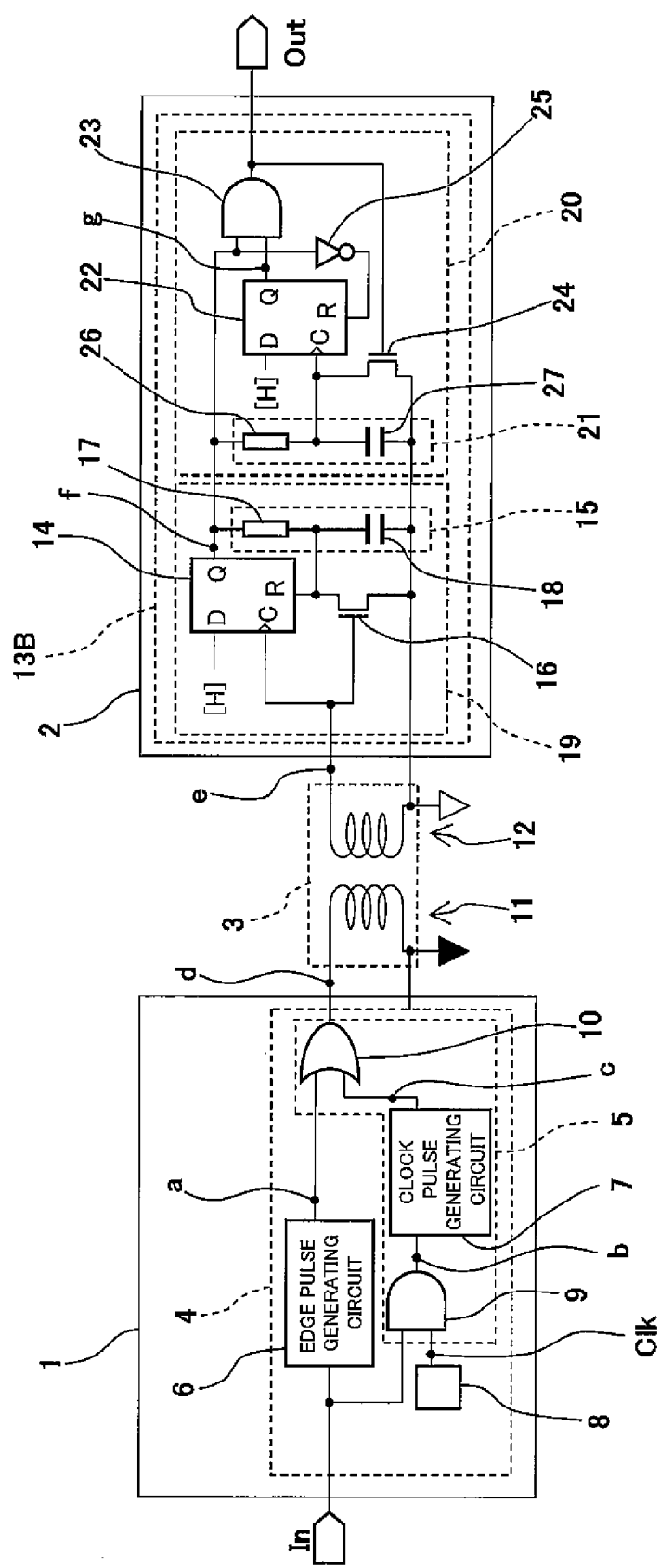
FIG. 3 is a circuit diagram showing a schematic configuration of an isolated communication system according to Embodiment 2 of the present invention.
Figure 4:
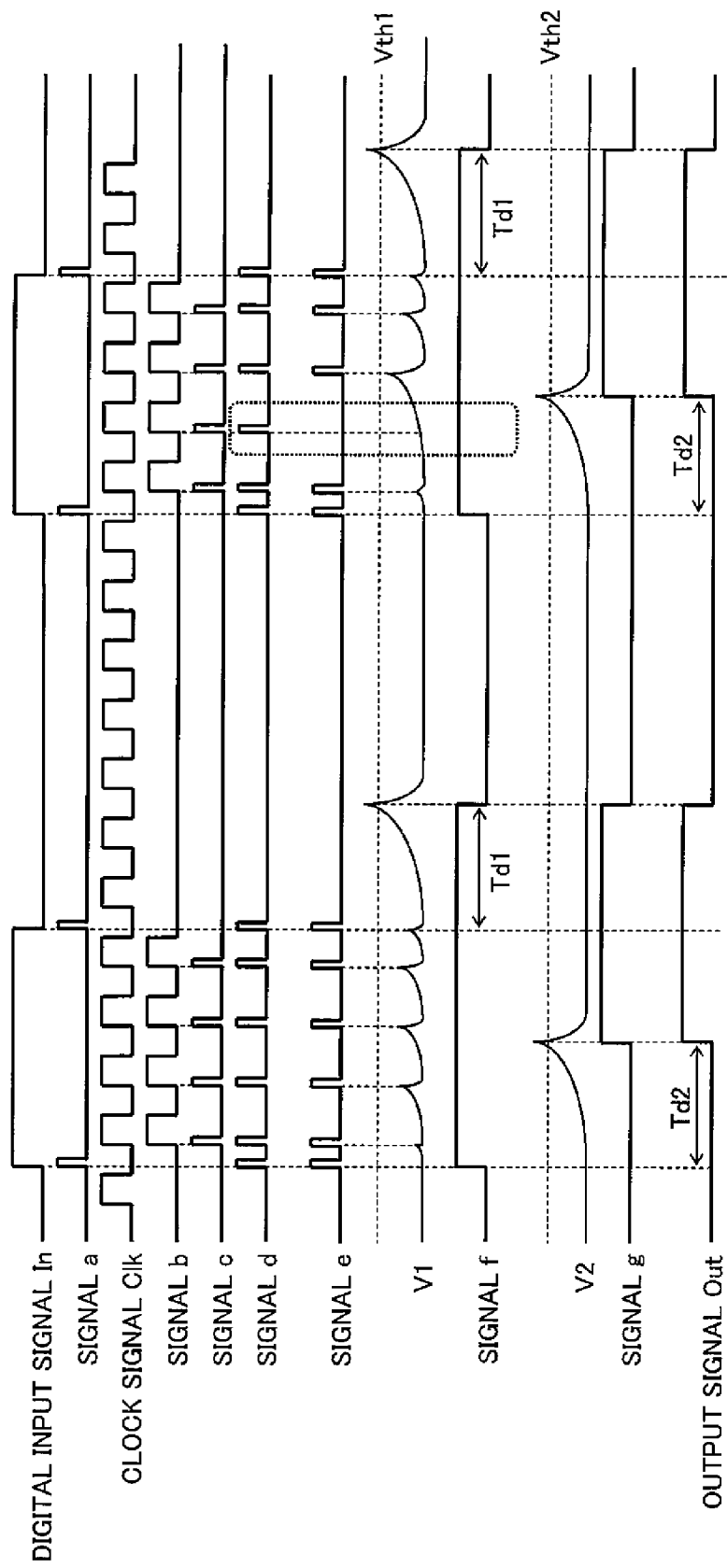
FIG. 4 is a graph showing waveforms of signals, respectively, in sections of the isolated communication system shown in FIG. 3.

Subsequently, description will be made in regard to an isolated communication system according to Embodiment 2 of the present invention. FIG. 3 is a circuit diagram showing a schematic configuration of the isolated communication system according to Embodiment 2 of the present invention. FIG. 4 is a graph showing waveforms of signals, respectively, in sections of the isolated communication system shown in FIG. 3. In the present embodiment, the same or corresponding constituents in Embodiment 1 are designated by the same reference numerals and description thereof is omitted.

As shown in FIGS. 3 and 4, the isolated communication system of the present embodiment differs in configuration from that of Embodiment 1 in that the receiving unit 2 decodes the received pulse signal "e" as a signal that transitions from the first level L to the second level H (first transition) after an elapse of a predetermined second time period Td2 from when an initial pulse of the received pulse signal "e" is detected.

More specifically, as shown in FIG. 3, a decode circuit 13B includes, in addition to the signal holding circuit 19, a first transition delaying circuit 20 for delaying the transition of the output signal "f" of the signal holding circuit 19 from the first level L to the second level H for the second time period Td2. The first transition delaying circuit 20 includes a second time period setting circuit 21 which starts to be charged when the output signal of the signal holding circuit 19 becomes the second level H and a charging voltage V2 becomes a threshold voltage Vth2 after an elapse of the second time period Td2 from the start of charging. The first transition delaying circuit 20 further includes a second latch circuit 22. The second latch circuit 22 outputs an output signal "g" of the second level H different from the first level L (higher in voltage than the first level L), when the charging voltage V2 in the second time period setting circuit 21 exceeds the threshold voltage V2. The first transition delaying circuit 20 still further includes an output circuit 23 which places output signal "Out" at the second level H only when both the output signal "g" of the second latch circuit 22 and the output signal "f" of the first latch circuit 14 are at the second level H; a second switching circuit 24 which causes the second time period setting circuit 21 to discharge when the output signal "Out" becomes the second level H; and a reset circuit 25 which resets the second latch circuit 22 when the output signal "f" of the first latch circuit 14 becomes the first level L to cause the output signal "g" of the second latch circuit 22 to transition to the first level L.

In the present embodiment, the second time period setting circuit 21 has a resistor 26 having one end connected to the output terminal Q of the first latch circuit, 14 and a capacitor 27 having one end connected in series to the resistor 26. The other end of the capacitor 27 is grounded.

In the present embodiment, the second latch circuit 22 is constituted by a D flip-flop circuit with a reset terminal R. The H level is constantly applied to an input terminal D of the D flip-flop circuit. The one end of the capacitor 27 of the second time period setting circuit 21 is connected to a clock input terminal C of the D flip-flop circuit. An output terminal Q of the D flip-flop circuit is connected to the input of the output circuit 23. The reset circuit 25 is connected to the reset terminal R. The charging voltage V2 of the second time period setting circuit 21 is the voltage V2 of the capacitor 27 and becomes the voltage of the clock input terminal C of the second latch circuit 22.

In addition, the output circuit 23 is constituted by an AND circuit to which both the output signal "f" of the first latch circuit 14 and the output signal "g" of the second latch circuit 22 are input and its output becomes the output signal "Out" of the receiving unit 2. In addition, the reset circuit 25 is an inverter for inverting the output signal "f" of the first latch circuit 14 and its output is input to the reset terminal R of the second latch circuit 22.

The second switching circuit 24 is constituted by a switching element such as FET or the like. One end of the capacitor 27 of the second time period setting circuit 21 (the clock input terminal C of the second latch circuit 22) is connected to either one of main terminals of the FET (for example, a drain terminal). The other of the main terminals of the FET (for example, a source terminal) is grounded. In addition, a control terminal of the FET (a gate terminal of the FET) is connected to the output side of the output circuit 23 and is fed with the output signal "Out" thereof.

In the second time period setting circuit 21, the second time period Td2 is set by the time constant determined by the resistor 26 and the capacitor 27. Herein, the time constant determined by the resistor 26 and the capacitor 27 is set such that the charging voltage V2 when the capacitor 27 is charged for the second time period Td2 becomes the voltage Vth2 at which the voltage level of the clock input terminal C of the second latch circuit 22 transitions from L level to H level.

In such a configuration, the transmission unit 1 sends the transmission pulse signal "d", and the receiving unit 2 receives a received pulse signal "e" based on the transmission pulse signal "d". When the receiving unit 2 detects an initial pulse of the received pulse signal 2 thus received, the output terminal Q of the first latch circuit 14 outputs the second level H, as according to Embodiment 1. The output terminal Q of the first latch circuit 14 becomes H level, and the capacitor 18 of the first time period setting circuit 15 starts to be charged and the capacitor 27 of the second time period setting circuit 21 also starts to be charged. In addition, the voltage level of the reset terminal R of the second latch circuit 22 becomes L level by the reset circuit 25, and thus, the reset of the second latch circuit 22 is released and the second latch circuit 22 enters a standby state, awaiting an input at the clock input terminal C. At this time, since the output signal "g" from the output terminal Q of the second latch circuit 22 is at the first level L, the output of the output circuit 23 remains at the first level L even when the output signal "f" from the output terminal Q of the first latch circuit 14 becomes the second level H.

Upon an elapse of the second time period Td2 after the start of charging of the capacitor 27, the charging voltage V2 of the second time period setting circuit 21 becomes the threshold voltage Vth2 and the clock input terminal C of the second latch circuit 22 becomes H level. Because of this, the output signal "g" of the output terminal Q of the second latch circuit 22 becomes the second level H (both the signals fed to the output circuit 23 go to the second level H) and, therefore, the output signal "Out" of the output circuit 23 also becomes the second level H (that is, the first transition is decoded). At this time, the second switching circuit 24 is turned on, and therefore, the capacitor 27 of the second time period setting circuit 21 is caused to discharge and the time of charging is reset (the charging voltage V2 becomes the ground voltage).

Thereafter, as according to Embodiment 1, when the output terminal Q of the first latch circuit transitions from the second level H to the first level L, the output signal "Out" of the output circuit 23 likewise transitions to the first level L (the second transition). At this time, the reset terminal R of the second latch circuit 22 is placed at H level by the second reset circuit 25 and, as a result, the second reset circuit 25 is reset and the output terminal Q of the second latch circuit 22 outputs the first level L.

In accordance with the foregoing configuration, as shown in FIG. 4, although a signal delay for the first time period Td1 occurs at the time when the second transition from the second level H to the first level L is decoded in the signal holding circuit 19 and makes the period during which the decoded output signal "Out" remains at the second level H, longer than that of the digital input signal "In" prior to isolated communication, such a signal delay for the first time period Td1 is cancelled by providing a time delay at the time when the first transition from the first level L to the second level H is decoded. Thus, the digital input signal "In" can be decoded as the output signal "Out" with much higher accuracy.

Here, the time constant determined by the resistor 26 and the capacitor 27 in the second time period setting circuit 21 may be set such that the second time period Td2 is a time equal to the first time period Td1.

In this case, since the first time period Td1 is equal to the second time period Td2, it becomes possible to make a period of time during which the second level H is held in the digital input signal "In" substantially invariable also in the output signal "Out" after decoding.

In this way, the output signal "Out" is decoded with a delay for the second time period Td2 with respect to the first transition of the digital input signal "In", thereby making it possible to lessen a temporal margin set in the timing of switching based on the output signal "Out" of a switching circuit or the like in a device (for example, a driving device) to which the receiving unit 2 is connected. Thus, quicker control is achieved.

Although the description has been made with regard to the foregoing embodiments of the present invention, it should be noted that the present invention is not limited in any way to these embodiments. Therefore, various improvements, variations and modifications may be made within the scope not departing from the object of the present invention.

For example, a plurality of each of the constituents in the aforesaid embodiments may be used in any combination. In addition, the first level may be a higher voltage than the second level (that is, the first level is an H level and the second level is an L level. Furthermore, in the aforesaid embodiments, the description has been made with regard to a configuration in which the first level L of the digital input signal "In" is decoded in correspondence to the first level L of the output signal "Out" and the second level H of the digital input signal "In" is decoded in correspondence to the second level H of the output signal "Out". However, each circuit may be configured such that the second level H of the output signal "Out" is decoded in correspondence to the first level L of the digital input signal "In" and the first level L of the output signal "Out" is decoded in correspondence to the second level H of the digital input signal "In".

The isolated communication systems, the transmission units and the receiving units according to the present invention are useful in performing high-accuracy isolated communication with a simple configuration.

As this invention may be embodied in several forms without departing from the sprit of essential characteristics thereof, the present embodiments are therefore illustrative and not restrictive, since the scope of the invention is defined by the appended claims rather than by the description proceeding them, and all changes that fall within metes and bounds of the claims, or equivalence of such metes and bounds thereof are therefore intended to be embraced by the claims.

What is claimed is:

1. An isolated communication system comprising a transmission unit, a receiving unit which is isolated from the transmission unit and an isolated communication unit which provides isolation between the transmission unit and the receiving unit and provides signal transmission between the transmission unit and the receiving unit, in which a digital input signal that transitions between a first level and a second level different from the first level is transmitted from the transmission unit to the receiving unit via the isolated communication unit;

the transmission unit including:
an edge pulse generating circuit configured to detect a transition of the digital input signal from the first level to the second level and generate a corresponding first pulse and configured to detect a transition of the digital input signal from the second level to the first level and generate a corresponding second pulse; and a transmission pulse signal generating circuit configured to generate a pulse corresponding to a clock signal having a predetermined cycle during a period of time in which the digital input signal remains at the second level, and add the pulse corresponding to the clock signal to the first and the second pulses generated in the edge pulse generating circuit to generate a transmission pulse signal having pulses corresponding to a plurality of clock signals, the pulses existing between the first pulse and the second pulse each generated in the edge pulse generating circuit;

the receiving unit being configured to decode a received pulse signal based on the transmission pulse signal received from the transmission unit via the isolated communication unit, as a signal that transitions from the first level to the second level when an initial pulse of the received pulse signal is detected and that transitions from the second level to the first level when a subsequent pulse is not detected within a predetermined first time period from when a most recent pulse of the received pulse signal is detected.

2. The isolated communication system as set forth in claim 1, wherein the receiving unit decodes the received pulse signal as a signal that transitions from the first level to the second level after an elapse of a predetermined second time period from when an initial pulse of the received pulse signal is detected.

3. The isolated communication system as set forth in claim 2, wherein the second time period is equal to the first time period.

4. The isolated communication system as set forth in claim 1, wherein the receiving unit includes a signal holding circuit which outputs a pulse having a duration of the first time period when a pulse of the received pulse signal is input, and a cycle of the clock signal is set shorter than the first time period.

5. A transmission unit applicable to an isolated communication system in which a digital input signal that transitions between a first level and a second level different from the first level is transmitted from the transmission unit to a receiving unit via an isolated communication unit which provides isolation between the transmission unit and the receiving unit and provides signal transmission between the transmission unit and the receiving unit, the transmission unit comprising:
an edge pulse generating circuit configured to detect a transition of the digital input signal from the first level to the second level and generate a corresponding first pulse and configured to detect a transition of the digital input signal from the second level to the first level and generate a corresponding second pulse; and a transmission pulse signal generating circuit configured to generate a pulse corresponding to a clock signal having a predetermined cycle during a period of time in which the digital input signal remains at the second level, and add the pulse corresponding to the clock signal to the first and the second pulses generated in the edge pulse generating circuit to generate a transmission pulse signal having pulses corresponding to a plurality of clock signals, the pulses existing between the first pulse and the second pulse each generated in the edge pulse generating circuit.

6. A receiving unit applicable to an isolated communication system in which a digital input signal that transitions between a first level and a second level different from the first level is transmitted from a transmission unit to the receiving unit via an isolated communication unit which provides isolation between the transmission unit and the receiving unit and provides signal transmission between the transmission unit and the receiving unit, said receiving unit comprising:

a decode circuit configured to receive a pulse signal based on a transmission pulse signal transmitted from the transmission unit via the isolated communication unit, and decode the received pulse signal, as a signal that transitions from the first level to the second level when an initial pulse of the received pulse signal is detected and that transitions from the second level to the first level when a subsequent pulse is not detected within a predetermined first time period from when a most recent pulse of the received pulse signal is detected.

* * * * *